(12) United States Patent
Wang et al.

(10) Patent No.: US 7,721,034 B2
(45) Date of Patent: May 18, 2010

(54) SYSTEM AND METHOD FOR MANAGING SYSTEM MANAGEMENT INTERRUPTS IN A MULTIPROCESSOR COMPUTER SYSTEM

(75) Inventors: Bi-Chong Wang, Austin, TX (US); Vijay Nijhawan, Austin, TX (US); Madhusudhan Rangarajan, Round Rock, TX (US); Wuxian Wu, Round Rock, TX (US)

(73) Assignee: Dell Products L.P., Round Rock, TX (US)

( * ) Notice: Subject to any disclaimer, the term of this patent is extended or adjusted under 35 U.S.C. 154(b) by 37 days.

(21) Appl. No.: 11/540,805

(22) Filed: Sep. 29, 2006

(65) Prior Publication Data
US 2008/0082711 A1    Apr. 3, 2008

(51) Int. Cl.
*G06F 13/24* (2006.01)
(52) U.S. Cl. ........................ 710/266; 710/268
(58) Field of Classification Search ................. 710/260, 710/261, 262, 266, 267, 268, 269
See application file for complete search history.

(56) References Cited

U.S. PATENT DOCUMENTS

| | | | | |
|---|---|---|---|---|
| 5,613,126 A | * | 3/1997 | Schmidt | 710/260 |
| 5,721,931 A | * | 2/1998 | Gephardt et al. | 710/260 |
| 5,892,956 A | * | 4/1999 | Qureshi et al. | 710/260 |
| 5,996,058 A | | 11/1999 | Song et al. | |
| 6,012,154 A | * | 1/2000 | Poisner | 714/55 |
| 6,282,601 B1 | * | 8/2001 | Goodman et al. | 710/260 |
| 6,453,278 B1 | * | 9/2002 | Favor et al. | 703/27 |
| 6,571,206 B1 | * | 5/2003 | Casano et al. | 703/25 |
| 6,633,940 B1 | * | 10/2003 | Alasti et al. | 710/262 |
| 6,711,642 B2 | * | 3/2004 | Huang | 710/260 |
| 6,862,641 B1 | * | 3/2005 | Gulick et al. | 710/260 |
| 7,099,978 B2 | | 8/2006 | Duncan et al. | |
| 7,200,701 B2 | * | 4/2007 | Stultz | 710/267 |
| 2002/0099893 A1 | | 7/2002 | Nguyen et al. | |
| 2005/0102447 A1 | * | 5/2005 | Stultz | 710/33 |
| 2006/0156291 A1 | | 7/2006 | Mahmoud et al. | |

OTHER PUBLICATIONS

Definition of Watchdog Timer from Wikipedia, undated.*

* cited by examiner

*Primary Examiner*—Khanh Dang
(74) *Attorney, Agent, or Firm*—Baker Botts L.L.P.

(57) ABSTRACT

A system and method is disclosed for managing system management interrupts in a multiprocessor system. The system described herein includes multiple processors, each of which may be directly coupled to memory. A primary processor will recognize the initiation of a system management interrupt. The primary processor will write a reason code to a storage location and set a watchdog timer, the expiration of which causes all of the processors of the system to enter a system management mode. After all of the processors have entered system management mode, it is determined if the reason code of the storage location corresponds to certain software-based system management interrupts. If so, the system management interrupt is handled by the local processors. Following the handling of the system management interrupt by the local processor, a signal is sent to each of the other processors to cause the processors to exit system management mode.

20 Claims, 3 Drawing Sheets

SYSTEM AND METHOD FOR MANAGING SYSTEM MANAGEMENT INTERRUPTS IN A MULTIPROCESSOR COMPUTER SYSTEM

TECHNICAL FIELD

The present disclosure relates generally to computer systems and information handling systems, and, more particularly, to a system and method for managing interrupts in a multiprocessor computer system.

BACKGROUND

As the value and use of information continues to increase, individuals and businesses seek additional ways to process and store information. One option available to these users is an information handling system. An information handling system generally processes, compiles, stores, and/or communicates information or data for business, personal, or other purposes thereby allowing users to take advantage of the value of the information. Because technology and information handling needs and requirements vary between different users or applications, information handling systems may vary with respect to the type of information handled; the methods for handling the information; the methods for processing, storing or communicating the information; the amount of information processed, stored, or communicated; and the speed and efficiency with which the information is processed, stored, or communicated. The variations in information handling systems allow for information handling systems to be general or configured for a specific user or specific use such as financial transaction processing, airline reservations, enterprise data storage, or global communications. In addition, information handling systems may include or comprise a variety of hardware and software components that may be configured to process, store, and communicate information and may include one or more computer systems, data storage systems, and networking systems.

An information handling system may include multiple processors, with each processor being directly coupled to a unique set of memory resources, and with each processor being able to generate a local system management interrupt. For example, each processor may generate a local system management interrupt upon the detection of a threshold number of correctable ECC (error correction code) errors within the memory coupled directly to the processor or at the completion of switching from an active rank to an online spare rank within the memory coupled to the processor.

Some systems require that, when one processor of the system generates a system management interrupt, all processors of the system are required to generate a system management interrupt and enter system management mode. In some systems, the processor that generated the initial system management interrupt, which sometimes is referred to as the local processors, issues a soft system management interrupt at the conclusion of the handling of the initial system management interrupt. The other processors of the system, however, could ignore the soft system management interrupt if another hardware interrupt is already pending at the other processors at the time of the initiation of the soft system management interrupt in the other processors.

SUMMARY

In accordance with the present disclosure, a system and method is disclosed for managing system management interrupts in a multiprocessor system. The system described herein includes multiple processors, each of which may be directly coupled to memory. A primary processor will recognize the initiation of a system management interrupt. The primary processor will write a reason code to a storage location and set a watchdog timer, the expiration of which causes all of the processors of the system to enter a system management mode. After all of the processors have entered system management mode, it is determined if the reason code of the storage location corresponds to certain software-based system management interrupts. If so, the system management interrupt is handled by the local processors. Following the handling of the system management interrupt by the local processor, a signal is sent to each of the other processors to cause the processors to exit system management mode.

The system and method disclosed herein is technically advantageous because a mechanism is provided for issuing a hardware-based system management interrupt in response to certain conditions within the system. In particular, when certain types of software-based system management interrupts are initiated in the system, the method described herein provides a technique for having all of the processors of the system enter system management mode in a manner that insures that the software-based system management interrupt will not be superseded by a subsequent hardware-based system management interrupt. In addition, the system and method described herein is also advantageous because the system and method provides a mechanism for handling a software-based system management interrupt quickly and without adversely affecting the operation of the other processors of the system. The system and method described herein is also advantageous because it provides for the identification of those software-based system management interrupts that are to be handled in a manner that prevents the interrupts by being superseded by a subsequent interrupt in the system. Other technical advantages will be apparent to those of ordinary skill in the art in view of the following specification, claims, and drawings.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

For purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, or other purposes. For example, an information handling system may be a personal computer, a network storage device, or any other suitable device and may vary in size, shape, performance, functionality, and price. The information handling system may include random access memory (RAM), one or more processing resources such as a central processing unit (CPU) or hardware or software control logic, ROM, and/or other types of nonvolatile memory. Additional components of the information handling system may include one or more disk drives, one or more network ports for communication with external devices as well as various input and output (I/O) devices, such as a keyboard, a mouse, and a video display. The information handling system may also include one or more buses operable to transmit communications between the various hardware components.

Figure 1:
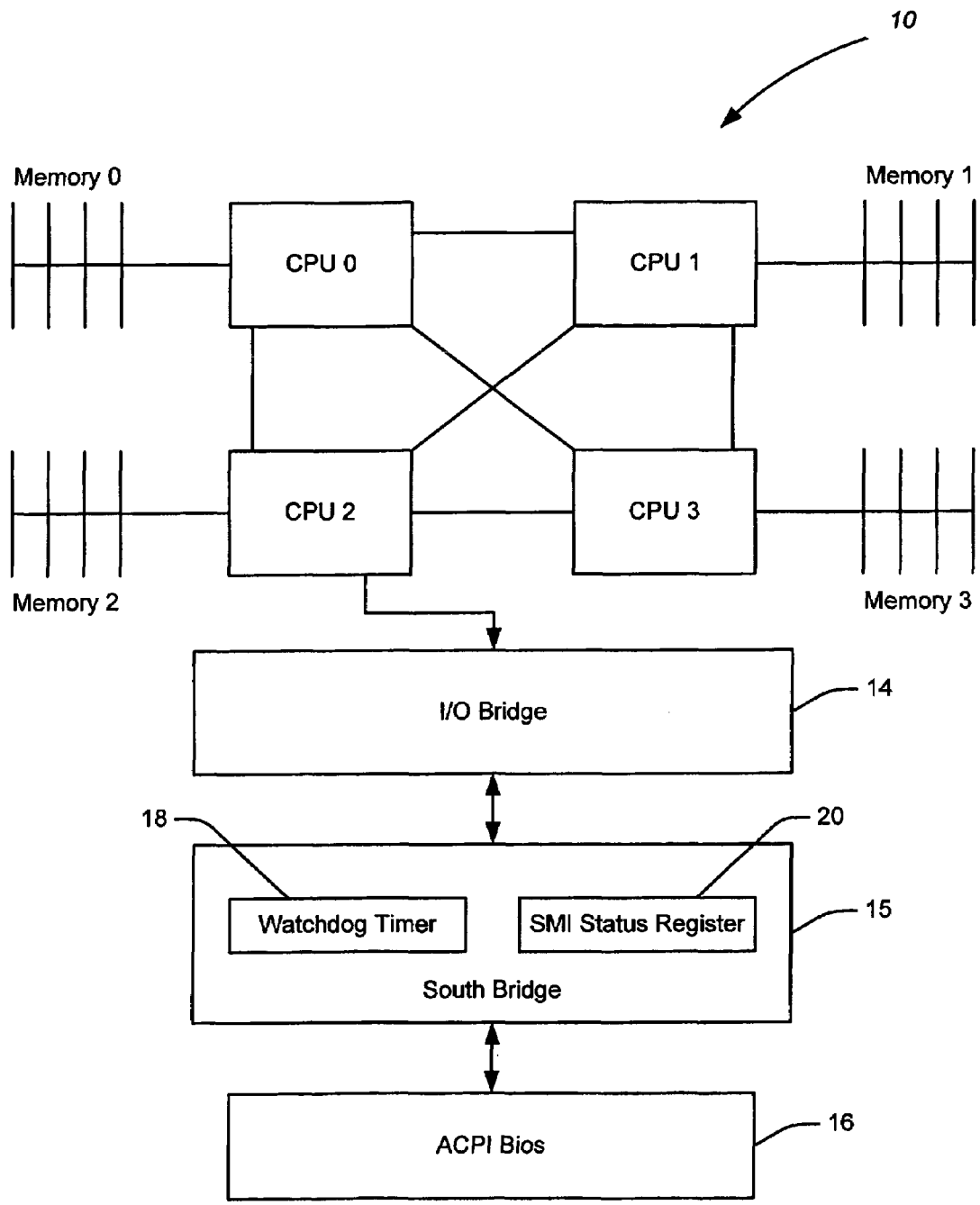
FIG. 1 is a block diagram of the architecture of a computer system.

Shown in FIG. 1 is a diagram of the architecture of a computer system, which is indicated generally at 10. Computer system 10 is a multiprocessor system that includes four processors, which are identified as CPU 0, CPU 1, CPU 2, and CPU 3. Each processor is directly coupled to each of the other processors. In addition, each processor is directly coupled to an array of local memory that is uniquely associated with the processor. In the example of FIG. 1, CPU 0 is directly coupled to a memory array identified as Memory 0; CPU 1 is directly coupled to Memory 1; CPU 2 is directly coupled to Memory 2; and CPU 3 is directly coupled to Memory 3.

In the architecture of FIG. 1, one of the processors, which in this example is CPU 2, is coupled to a first I/O bridge 14, which is sometimes referred to as a north bridge. I/O bridge 14 is coupled to a second I/O bridge 15 or south bridge. A BIOS ROM 16 is coupled to south bridge 15. BIOS ROM 16 includes both standard BIOS software and, as indicated in FIG. 1, ACPI power management software. Included within south bridge 15 are a watchdog timer 18 and a SMI status register 20. Watchdog timer 18 is a hardware element that can be initiated to generate a system management interrupt.

In operation, the system and method disclosed herein provides for the identification and handling of certain interrupt events in the computer system. If a System Management Interrupt event occurs within the multiprocessor computer system, the computer system causes the initiation of a hardware system management mode in all of the processors of the computer system. Because the system management interrupt is a hardware system management interrupt, the interrupt cannot be superseded by a subsequent interrupt, as can occur with a software system management interrupt that is pending at the time of the issuance of a subsequent hardware system management interrupt.

The system and method that is disclosed herein concerns the management of interrupts within a multiprocessor computer system. As an example, when the number of single bit errors within a single memory array reaches a threshold value, a system management interrupt is initiated. The processor that is designated to handle the system manage interrupt is the processor that is directly coupled to the memory array that includes the single bit errors. As an example, assume that a threshold number of single bit errors have occurred in Memory 1. A system management interrupt will be issued, and CPU 1 will handle the system management interrupt. In this description, the processor that is handling the interrupt will be referred to as the local processor because this processor is local to or directly coupled to the local memory that is the source of the system management interrupt.

Figure 2:
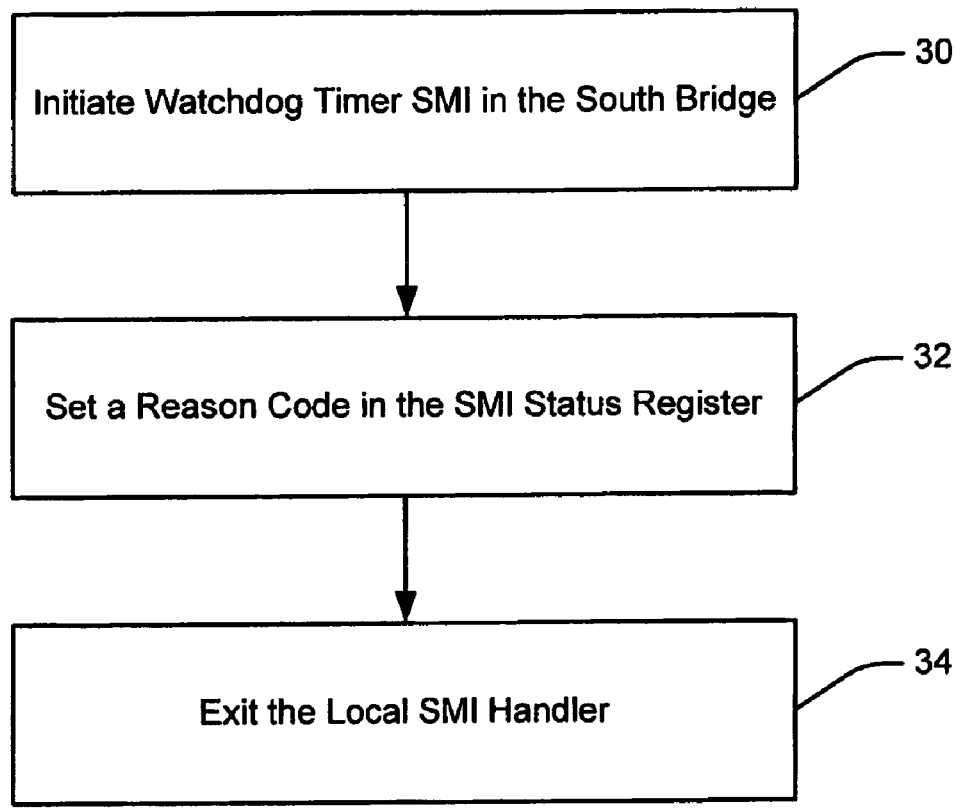
FIG. 2 is a flow diagram of the operation of a local system management interrupt handler in a local processor.

Shown in FIG. 2 are a series of method steps associated with the operation of a local SMI handler in a local processor. At step 30, following the initiation of the local SMI handler in the local processor, the local processor initiates a watchdog timer 18 in south bridge 15 (step 30). At step 32, the local processor will also write a reason code to SMI status register 20 in south bridge 15. The reason code identifies whether the system management interrupt that is related to a single bit error or a spare rank error. Following the writing of a reason code to SMI status register 20, the local processor exits the local SMI handler at step 34.

Figure 3:
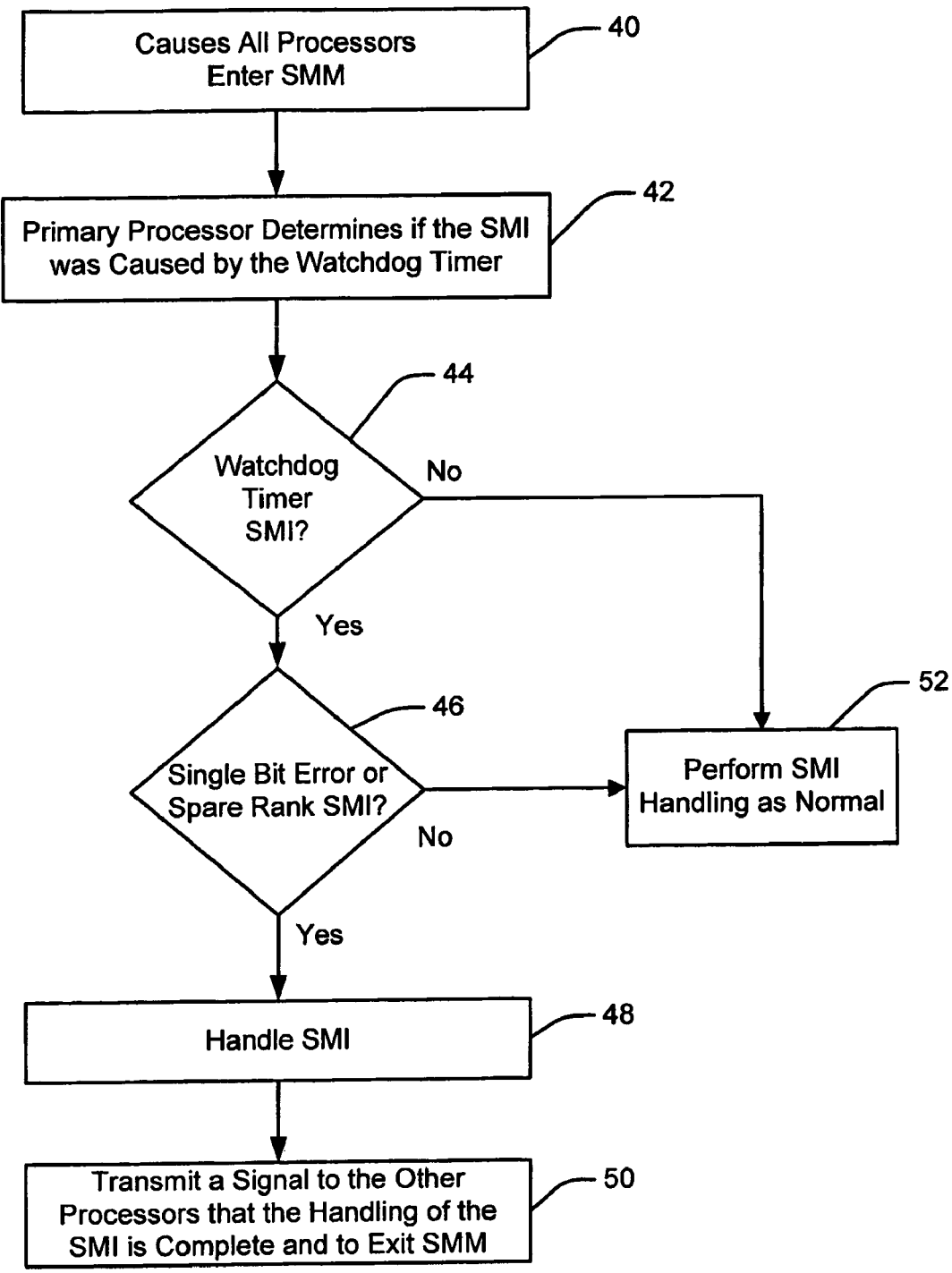
FIG. 3 is a flow diagram of the global handling of the system management interrupt.

Shown in FIG. 3 is a flow diagram of a series of method steps for the global handling of the system management interrupt. The steps of FIG. 3 are typically performed following the step of FIG. 2. At step 40, all of the processors of the system enter system management mode. A primary processor, which is sometimes referred to as the master processor or the bootstrap processor of the system, determines at step 42 if the system management interrupt was caused by the expiration of a watchdog timer. If the system management interrupt was not caused by the expiration of a watchdog timer, the primary processor branches from step 44 to step 52 and continues to process the system management interrupt normally.

If the system management interrupt was caused by the expiration of a watchdog timer, the flow diagram branches from step 44 to step 46, where it is determined if the system management interrupt is caused by either a single bit error or a spare rank error in memory. The identification of whether the system management interrupt was caused by a single bit error or a spare rank error is determined by reading the content of SMI status register 20. As described with respect to FIG. 2, following the initiation of a watchdog timer, a reason code is written to SMI status register 20 to identify that the system management interrupt was caused by either a single bit error or a spare rank error. If the system management interrupt was not caused by either a single bit error or a spare rank error, the system management interrupt is processed normally at step 52.

If the system management interrupt was caused by a single bit error or a spare rank error, the flow diagram branches to step 48 and the system management interrupt is handled normally by the local processor, which is the processor that is directly coupled to the memory that is the source of the single bit error or spare rank error. Following the handling of the system management interrupt at step 48, the local processor issues a signal to each of the other processors to notify the other processors that cause the other processors to exit system management mode.

The system and method provides a mechanism for issuing a hardware-based system management interrupt in response to certain conditions within the system. In particular, when certain types of software-based system management interrupts are initiated in the system, the method described herein provides a technique for having all of the processors of the system enter system management mode in a manner that insures that the software-based system management interrupt will not be superseded by a subsequent hardware-based system management interrupt. In addition, the system and method described herein provides a mechanism for handling a software-based system management interrupt quickly and without adversely affecting the operation of the other processors of the system. The system and method described herein also provides for the identification of the software-based system management interrupts that are to be handled in a manner that prevents the interrupts by being superseded by a subsequent interrupt in the system.

Although the system and method disclosed herein has been described with respect to a distributed memory configuration, it should be understood that the system and method described herein is not limited to the memory configuration shown in FIG. 1. Rather, then system and method described herein may be employed in any multiprocessor system to manage the contention among interrupts in a multiprocessor system. Although the present disclosure has been described in detail, it should be understood that various changes, substitutions, and alterations can be made hereto without departing from the spirit and the scope of the invention as defined by the appended claims.

What is claimed is:

1. A method for managing system management interrupt in a multiprocessor system, wherein the multiprocessor system comprises two or more processors, comprising:
   prior to all of the two or more processors entering a system management mode:
      initiating an interrupt handling sequence at a first processor in the system;
      initiating a timer in the system, wherein the expiration of the timer causes each of the processors of the system to enter the system management mode; and
      writing a code to a storage location to identify if the interrupt was caused by a reason code;
   causing all of the processors to enter system management mode following the expiration of the timer; and
   if it is determined that the interrupt was caused by a reason code and it is determined that a threshold level of errors has occurred:
      handling the interrupt at a processor of the system; and
      transmitting a signal to the processors of the system that are not handling the interrupt to cause these processors to exit system management mode.

2. The method for managing interrupts in a multiprocessor system of claim 1, wherein the reason code of the interrupt comprises reaching a threshold level of single bit errors in a memory of the multiprocessor system.

3. The method for managing interrupts in a multiprocessor system of claim 1, wherein the reason code of the interrupt comprises a spare rank error in a memory of the system.

4. The method for managing interrupts in a multiprocessor system of claim 1, wherein the step of writing a code to a storage location comprises the step of writing a code to a register in an I/O bridge of the system.

5. The method for managing interrupts in a multiprocessor system of claim 1, wherein the I/O bridge comprises the south bridge of the computer system.

6. The method for managing interrupts in a multiprocessor system of claim 1, wherein the step of initiating a timer in the system comprises the step of initiating a watchdog timer in an I/O bridge of the computer system.

7. The method for managing interrupts in a multiprocessor system of claim 1, wherein the I/O bridge comprises the south bridge of the computer system.

8. The method for managing interrupts in a multiprocessor system of claim 1, wherein the predetermined cause of the interrupt comprises one of reaching a threshold level of single bit errors in the memory of the system or a spare rank error in a memory of the system.

9. The method for managing interrupts in a multiprocessor system of claim 8, wherein the step of writing a code to a storage location comprises the step of writing a code to an I/O bridge of the computer system, wherein the code corresponds to the reason code of the interrupt.

10. The method for managing interrupts in a multiprocessor system of claim 9, wherein the step of initiating a timer in the system comprises the step of initiating a watchdog timer in an I/O bridge of the computer system.

11. An information handling system, comprising:
   multiple processors;
   memory, wherein each processor is coupled directly to memory;
   an I/O bridge that is communicatively coupled to at least one of the processors of the system, wherein the I/O bridge includes a timer and a register for recording the identity of an interrupt in the system,
   wherein, upon the recognition of an interrupt event in the computer system and prior to all the processors of the system entering a system management mode, a code is written to the register to identify the interrupt event in the computer system and the timer is set to cause a hardware-based interrupt to place each of the processors in system management mode;
   wherein the code identifies if the interrupt event was the result of a reason code and, if the interrupt event was the result of a reason code and it is determined that a threshold level of errors has occurred, causing each of the processors to exit system management mode following the handling of the interrupt event in one of the processor of the system.

12. The information handling system of claim 11, wherein the reason code of the interrupt comprises reaching a threshold level of single bit errors in a memory of the multiprocessor system.

13. The information handling system of claim 11, wherein the reason code of the interrupt comprises a spare rank error in a memory of the system.

14. The information handling system of claim 11, wherein the I/O bridge is the south bridge of the system.

15. The information handling system of claim 11, wherein the timer is a watchdog timer and wherein the I/O bridge is the south bridge of the system.

16. The information handling system of claim 11, wherein the reason code of the interrupt comprises one of reaching a threshold level of single bit errors in the memory of the system or a spare rank error in a memory of the system.

17. The information handling system of claim 16, wherein the timer is a watchdog timer and wherein the I/O bridge is the south bridge of the system.

18. A method for managing system management interrupt in a multiprocessor system, wherein the multiprocessor system comprises two or more processors, comprising:
   prior to all of the two or more processors entering a system management mode:
      recognizing an interrupt event in the system;
      initiating a timer in the system, wherein the expiration of the timer causes each of the processors of the system to enter a system management mode;
      writing a code to a storage location to identify if the interrupt event was caused by a reason code;
   causing all of the processors to enter system management to handle an interrupt mode following the expiration of the timer; and
   if it is determined that the interrupt event was caused by a predetermined cause and it is determined that a threshold level of errors has occurred:
      handling the interrupt at a processor of the system; and
      transmitting a signal to the processors of the system that are not handling the interrupt to cause these processors to exit system management mode.

19. The method for managing interrupts in a multiprocessor system of claim 18, wherein the reason code indicates that the interrupt event is one of reaching a threshold level of single bit errors in the memory of the system or a spare rank error in a memory of the system.

20. The method for managing interrupts in a multiprocessor system of claim 18, wherein the timer and the storage location are in a south bridge of the system.

* * * * *